United States Patent Office 2,711,417
Patented June 21, 1955

2,711,417

PREPARATION OF ORGANOSILYLPHENOLS

Kurt C. Frisch, Huntingdon Valley, Pa., assignor to General Electric Company, a corporation of New York No Drawing. Application May 6, 1953,
Serial No. 353,424

4 Claims. (Cl. 260—448.2)

This invention is concerned with a method for preparing organosilylphenols. More particularly, the invention relates to a process for preparing triorganosilylphenols which process comprises reacting (a) a compound corresponding to the general formula

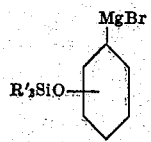

with (b) a compound having the formula R₃SiX thereby to obtain a composition having the formula

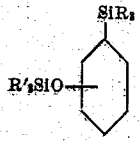

and thereafter removing the triorganosiloxy group of the latter compound by hydrolysis to obtain an organosilylphenol having the formula

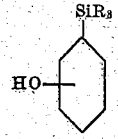

where in the above formulae, R and R' are monovalent hydrocarbon radicals and X is a halogen.

Until recently, there has been no success in preparing triorganosilylphenols, for instance, paratrimethylsilylphenol. Thus, Gilman et al. in J. A. C. S. 72, 2629 (1950), have reported several unsuccessful attempts to prepare ortho- and para-trimethlysilylphenol by various methods concluding that such phenols were unstable structures and could not be prepared. At a later date Sunthankar et al. in J. A. C. S. 72, 4884 (1950) succeeded in preparing trimethyl- and triphenylsilynaphthols by the reaction of chlorosilanes on the corresponding naphthyllithium compounds. Recently, Speier in J. A. C. S. 74, 1003 (1952) reported the successful synthesis of o- and p-trimethylsilylphenol by the reaction of o- or p-chlorophenoxytrimethylsilane with sodium and trimethylchlorosilane in a toluene solution. Speier reported at the same time that magnesium could not be used in place of sodium when used with p-bromophenoxytrimethylsilane.

Contrary to the statements found in the preceding articles, unexpectedly I have discovered that I am able to prepare triorganosilylphenols quite readily, in good yields, and at less expense than has heretofore been possible, by reacting a Grignard reagent having the formula

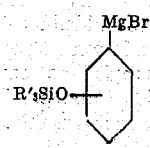

with a triorganohalogenosilane of the formula R₃SiX to obtain a triorganosiloxyphenyltriorganosilane of the formula

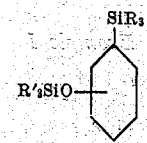

The latter compound is then hydrolyzed so as to effect removal of the triorganosiloxy group from the benzene nucleus and to replace it with a hydroxyl group thereby to obtain a triorganosilylphenol having the formula

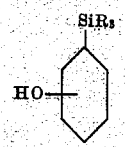

The use of the magnesium reagent in place of the sodium used by Speier is more economical, less hazardous and fits in more appropriately into manufacturing procedures where the availability of and technical knowledge concerning Grignard reagents is greater than that using, for instance, sodium. In the above formulae, R and R' are monovalent hydrocarbon radicals and X is a halogen, for instance, chlorine, fluorine, bromine, etc.

Among the values for which R and R' may stand are, for instance, alkyl radicals (e. g., methyl, ethyl, propyl, isopropyl, butyl, decyl, etc.), aryl radicals (e. g., phenyl, naphthyl, biphenyl, etc.), aralkyl radicals (e. g., benzyl, phenylethyl, etc.), alkaryl radicals (e. g., tolyl, xylyl, ethylphenyl, etc.), cycloaliphic radicals (e. g., cyclohexyl, cyclopentyl, cyclohexenyl, etc.), as well as other monovalent hydrocarbon radicals containing substituents thereon which are inert, for instance, halogens, such as chlorine, bromine, fluorine, etc. Preferably R and R' are the same and advantageously are methyl radicals.

In carrying out my claimed process, a Grignard reagent is prepared as follows. A bromophenoxytriorganosilane, for instance, bromophenoxytrimethylsilane (obtained by reacting bromophenol with a triorganohalogenosilane, for instance, trimethylchlorosilane in a solvent such as benzene, xylene, toluene, etc., in the presence of a hydrohalide acceptor such as pyridine) is caused to react with magnesium turnings in an alkyl ether, e. g., diethyl ether, to give the triorganosiloxyphenylmagnesium bromide, for instance, trimethylsiloxyphenylmagnesium bromide having the formula

This Grignard reagent is then reacted with a triorganohalogenosilane, for instance, trimethylchlorosilane, preferably in an alkyl ether solvent by mixing the ingredients together and advantageously heating the mixture at the reflux temperature of the mass. Thereafter, the reaction product is suitably processed, for instance, by filtration and fractional distillation to obtain the triorganosiloxyphenyltriorganosilane.

Hydrolysis of the triorganosiloxyphenyltriorganosilane is generally carried out by forming a solution of the latter in a suitable solvent such as, e. g., an alkanol (such as ethanol) and water, and acidifying the mixture slightly with, for instance, hydrochloric acid, and thereafter heating the mixture at the reflux temperature of the mass for a period of time ranging from about 15 minutes to about 2 to 3 hours. The triorganosilylphenol in the form of an alcohol solution usually forms as an upper layer which can be removed by decantation or other suitable means. The alcohol solvent is then removed from the latter to give the triorganosilylphenol.

In order that those skilled in the art may better understand how the present invention may be practiced, the following examples are given by way of illustration and not by way of limitation. All parts are by weight.

*Example 1*

In a suitable three-necked flask equipped with stirrer, reflux condenser, and dropping funnel, was placed 346 grams p-bromophenol, 158 grams pyridine and 300 cc. benzene. A solution of 217 grams trimethylchlorosilane in 150 cc. benzene was added slowly through the dropping funnel while cooling the reaction mixture in an ice bath. The entire mass was then allowed to stir for about 3 hours, the benzene was removed by fractional distillation, and the residual liquid fractionated to give a product which distilled at around 113° C. at 14 mm. as a colorless liquid. Analysis of this compound showed it to contain 11.3% silicon (theoretical 11.4% silicon) identifying the material as p-bromophenoxytrimethylsilane.

The above prepared para-bromophenoxytrimethylsilane in an amount equal to about 185 grams in 200 cc. diethyl ether was gradually added to a reaction vessel containing 19 grams magnesium turnings in 200 cc. diethyl ether. The reaction mixture was then heated at the reflux temperature of the mass for about 18 hours to form the Grignard reagent having the formula

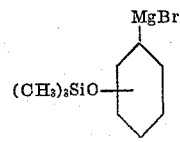

Half of this Grignard reagent was added slowly with stirring to a mixture of 42.7 grams trimethylchlorosilane and 150 cc. diethyl ether. The reaction mixture was then heated at the reflux temperature of the mass for about 3 hours, the diethyl ether removed, and the residual liquid fractionally distilled to give a product distilling at about 114–115° C. at 23 mm. Analysis of this compound showed it to contain about 22.0% silicon which substantially identified the reaction product to be p-trimethylsilylphenoxytrimethylsilane having the formula

Hydrolysis of the para-trimethylsilylphenoxytrimethylsilane was carried out as follows. About 10.2 grams of the latter product was added to a solution of 100 cc. ethanol and 60 cc. water. The solution was slightly acidified with HCl and the mixture heated at the reflux temperature of the mass for about 1 hour. Thereafter, the clear liquid layer which formed on the top was removed, the ethyl alcohol distilled to leave a solid matter which when recrystallized several times from water yielded colorless needles having a melting point of 74–75° C. This compound was identified as being essentially pure p-trimethylsilylphenol as evidenced by the fact that it contained about 15.8% silicon and agreed with the previously recorded melting point for para-trimethylsilylphenol of 74–74.2° C. described by Speier in his above-mentioned article.

*Example 2*

The compound p-triphenylsilylphenol having the formula

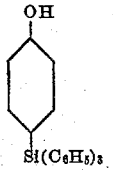

may be prepared in the same way as described above for the preparation of trimethylsilylphenol with the exception that instead of using trimethylchlorosilane with p-trimethylsiloxyphenolmagnesium bromides, one employs triphenylchlorosilane and carries out the same succeeding steps in the isolation of the p-triphenylsilylphenol.

It will, of course, be apparent to those skilled in the art that trioganosilyl groups may be attached to other points on the phenyl nucleus, for instance, instead of being in the para position, it may be in the ortho or meta positions. Moreover, the organic groups positioned around the silicon atom may also be varied widely, in accordance with the various values for which R stands. R, of course, may be different organic radicals, as, for instance, the monovalent hydrocarbon radicals around the silicon atom may consist of one methyl group and two ethyl groups, or one methyl group and two phenyl groups, etc. I do not intend to be limited to the type of organic groups around the silicon atom nor to the position on the benzene nucleus to which the silicon atom is attached. Obviously, the conditions for carrying out the reactions herein described may be varied widely as will be apparent to those skilled in the art and no intent should be read into the present disclosures that the claimed process is limited to those described in the instant description.

The compositions prepared in accordance with my process may be used in various applications. They may be reacted with aldehydes, for instance, formaldehyde, to form resinous compositions of the oil-soluble type which can be employed per se or in combination with other phenolic molding resins as modifying agents therefor in coating and molding (using various fillers) applications. In connection with molding compositions prepared from the compositions herein described, one may mix together the para-trimethylsilylphenol with about two equivalents of hexamethylenetetramine at elevated temperatures of the order of about 160–180° C. to give a resinous material which upon cooling to room temperature can be ground to a fine powder and mixed with asbestos powder and additional hexamethylenetetramine and thereafter molded at elevated temperatures of the order of about 150–175° C. at a pressure varying from about 1000 to 2000 p. s. i. for times of the order of about one-half to one hour to give hard, dense, smooth molded parts which will be found to be quite heat stable. Such molded materials can be used for electrical installation such as, for instance, in various electrical devices in which inserts can be molded. In addition, because of the extreme heat resistance, molding compositions derived from the triorganosilylphenols may be used as described above to form handles, cups and saucers as well as other heat-resistant containers.

In addition to the preparation of the triorganosilylphenols described above through the medium of the intermediate triorganosilylphenoxytriorganosilane, one can also prepare organohalogenosilylphenoxytriorganosilanes by means of a similar procedure. Thus I have been able to prepare as follows p-trimethylsiloxyphenylmethyldichlorosilanes having the formula

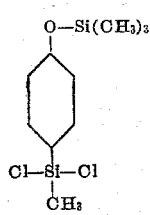

To a solution of 333 grams of methyltrichlorosilane in 500 cc. diethyl ether was added a p-trimethylsiloxyphenylmagnesium bromide solution prepared from 181.9 grams p-bromophenoxytrimethylsilane employing the method described in Example 1 above. The reaction mixture was heated at the reflux temperature of the mass for about 3 hours and the inorganic precipitate which formed was removed by filtration and washed with ethyl ether. The washings were combined with the liquid filtrate, and the diethyl ether solvent and excess methyltrichlorosilane were removed, and the residual liquid vacuum-distilled to give a product boiling within the range of 132–142° C. at 12 mm. This material was identified as p-trimethylsiloxyphenylmethyldichlorosilane as evidenced by the fact that analysis thereof showed it to contain 19.51% silicon (theoretical 20.08% silicon). This compound may be hydrolyzed with water to give polymers having the recurring structural unit

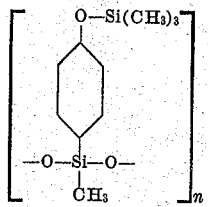

where $n$ is an integer greater than 1. Such polymeric materials can thereafter be suitably treated to remove the trimethylsiloxy units and to substitute a hydroxyl group, which compositions can thereafter be reacted with, for instance, formaldehyde similarly as any phenol is reacted, to give modified organopolysiloxanes which may be employed as modifying agents for either silicones or phenolic resins.

What I claim as new and desire to secure by Letters Patent of the United States is:

1. The process for preparing triorganosilylphenols which process comprises reacting (a) a compound corresponding to the general formula

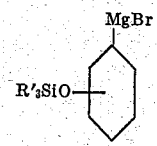

with (b) a compound having the formula $R_3SiX$ thereby to obtain a composition having the formula

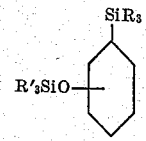

and thereafter removing the triorganosiloxy group of the latter compound by hydrolysis to obtain an organosilylphenol having the formula

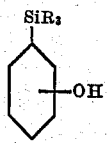

where in the above formulae R and R' are monovalent hydrocarbon radicals and X is a halogen.

2. The process for making p-trimethylsilylphenol which comprises reacting (a) p-trimethylsiloxyphenylmagnesium bromide with trimethylchlorosilane and thereafter hydrolyzing the formed p-trimethylsiloxyphenyltrimethylsilane to obtain p-trimethylsilylphenol having the formula

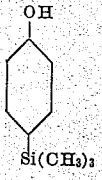

3. The process for preparing p-triphenylsilylphenol which comprises reacting (a) p-trimethylsiloxyphenolmagnesium bromide with (b) triphenylchlorosilane and thereafter hydrolyzing the formed p-trimethylsiloxyphenyltriphenylsilane to obtain p-triphenylsilylphenol having the formula

4. The chemical compound p-trimethylsiloxyphenylmethyldichlorosilane having the formula

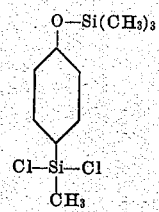

References Cited in the file of this patent

Speier: "Jour. Am. Chem. Soc.," vol. 74 (1952), pages 1003–1010.

Frisch et al.: "Jour. Am. Chem. Soc.," vol. 75 (1953), pages 1249–1252.